US005329429A

United States Patent [19]
Mathias et al.

[11] Patent Number: 5,329,429
[45] Date of Patent: Jul. 12, 1994

[54] VEHICLE LIGHT

[75] Inventors: Larry E. Mathias, Hudsonville; Jason M. Hathaway, Holland, both of Mich.

[73] Assignee: Prince Corporation, Holland, Mich.

[21] Appl. No.: 964,930

[22] Filed: Oct. 22, 1992

[51] Int. Cl.$^5$ .................................. B60Q 1/00
[52] U.S. Cl. .................... 362/74; 362/364; 362/396
[58] Field of Search ............ 362/83.3, 61, 74, 364, 362/396

[56] References Cited

U.S. PATENT DOCUMENTS

| | | |
|---|---|---|
| D. 324,111 | 2/1992 | Arbisi . |
| 1,987,705 | 1/1935 | Pedersen .................. 362/364 |
| 2,116,317 | 5/1938 | Marshall et al. ............ 362/74 |
| 2,116,324 | 5/1938 | Prance ....................... 362/74 |
| 3,305,168 | 2/1967 | Ramniceanu ............... 362/74 |
| 3,514,010 | 5/1970 | Rossi ......................... 362/74 |
| 3,781,790 | 12/1973 | Dawson ..................... 362/396 |
| 4,241,870 | 12/1980 | Marcus . |
| 4,584,631 | 4/1986 | Cody et al. . |
| 4,670,819 | 6/1987 | Boerema et al. . |
| 4,674,012 | 6/1987 | Olmos ........................ 362/396 |
| 4,686,609 | 8/1987 | Dykstra et al. . |
| 4,739,224 | 4/1988 | Geerlings . |
| 4,824,159 | 4/1989 | Fluharty et al. . |
| 4,828,910 | 5/1989 | Haussling . |
| 4,909,470 | 3/1990 | Clark . |
| 5,070,434 | 12/1991 | Suman et al. . |
| 5,181,773 | 1/1993 | Colvin ........................ 362/83.3 |

FOREIGN PATENT DOCUMENTS

| | | | |
|---|---|---|---|
| 3813349 | 6/1989 | Fed. Rep. of Germany ........ 362/74 |
| 0067135 | 4/1984 | Japan ..................... 362/74 |

*Primary Examiner*—Richard A. Bertsch
*Assistant Examiner*—Michael I. Kocharov
*Attorney, Agent, or Firm*—Price Heneveld Cooper

[57] ABSTRACT

A lamp assembly for a vehicle is integrally formed in a vehicle panel which includes a concave recess for receiving a lamp socket and lamp. A plurality of lens receiving slots extend around the periphery of the concave recess for snap-fitting a lens to the panel. In a preferred embodiment, the concave recess is offset by a peripheral convex rim to position the lens toward the vehicle interior. In a preferred embodiment also, the panel is a vehicle headliner and the concave recess includes an aperture for receiving a spring clip which mounts a lamp socket to the headliner within the concave recess.

12 Claims, 2 Drawing Sheets

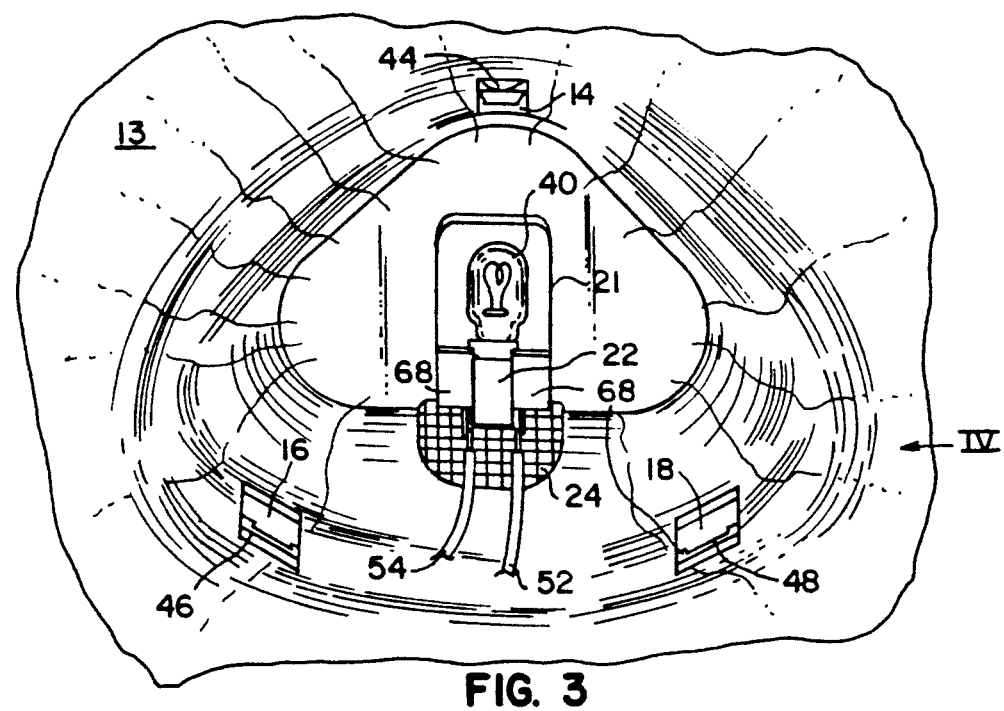
FIG. 3
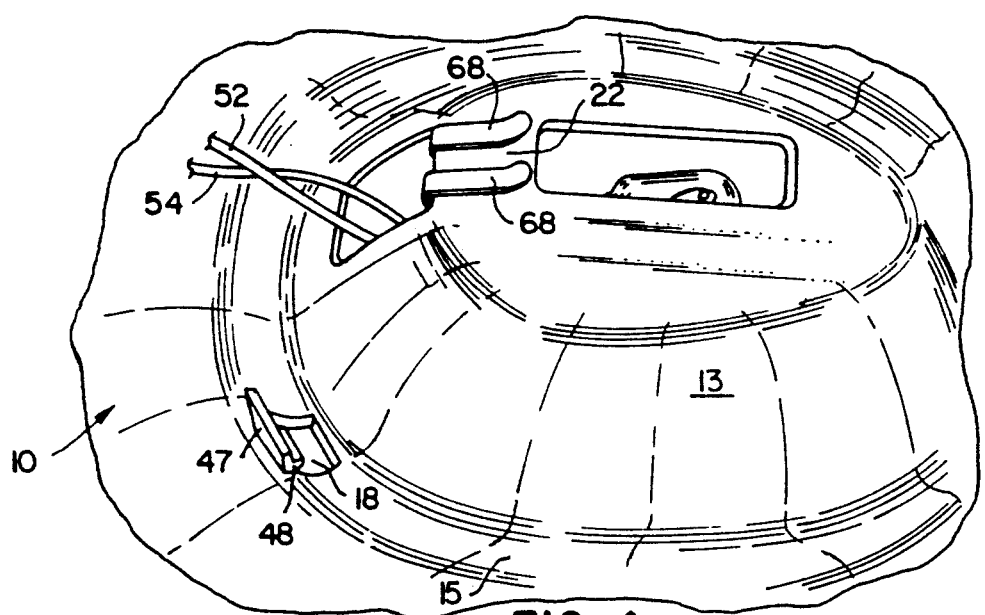
FIG. 4
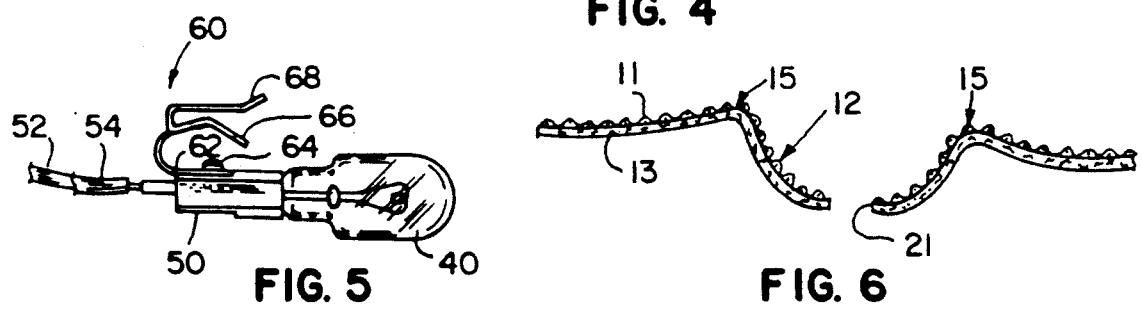
FIG. 5
FIG. 6

:

VEHICLE LIGHT

BACKGROUND OF THE INVENTION

The present invention relates to an auxiliary light for a vehicle such as an automobile and particularly one which does not require a mounting bezel.

Vehicles typically include a variety of interior lighting such as overhead dome lights and door panel lights to assist ingress and egress, map reading lights and the like. In the past, such lighting assemblies have frequently been manufactured by companies specializing in light assemblies who provide them to automotive manufacturers for subsequent assembly into a finished vehicle. Such assemblies have, accordingly, been self-contained and will typically include a lamp housing with a trim bezel and a removable lens for access to fasteners for securing the housing to the vehicle support structure. Frequently, the lamp housing will also include a separate reflector for the bulb which adds another component to the lamp assembly. The resultant structure, although functioning well to providing illumination to the vehicle interior, is a complex, multi-component unit which is both costly in terms of parts and material but also in terms of assembly labor and subsequent installation in the vehicle or a subcomponent of the vehicle.

With the integration of vehicle parts such as door panels and headliners which are now frequently being supplied by a single manufacturer, the assembly of such prior art lamp structures is easier since they can be preassembled prior to the installation of the main vehicle panel into the vehicle during assembly. Nonetheless, the cost of such prior art assemblies and their assembly itself remains high.

SUMMARY OF THE PRESENT INVENTION

The lamp of the present invention is integrated into a vehicle panel which is formed to integrally include a lamp receiving structure and a lens receiving structure such that the vehicle interior lamp includes a minimum number of components and therefore reduces both the cost of the structure as well as its assembly cost.

An apparatus embodying the present invention includes a vehicle panel formed to define a concave lamp receiving area including at least a pair of lens receiving mounting slots around the periphery thereof. The panel further includes a convex rim surrounding the concave recess for positioning the lens toward the vehicle interior. In a preferred embodiment, aperture means are formed in the panel near the center of the concave area for receiving a lamp assembly including a lamp, a lamp socket and a clip for attaching the socket to the panel. The lamp assembly further includes a lens having tab means which extend into the mounting slots formed in the panel for attaching the lens directly to the panel.

In a preferred embodiment of the invention, the panel comprises a vehicle headliner, and a generally triangular concave depression is integrally formed in the headliner in an overhead dome lamp area and includes three mounting slots extending at approximately equal distances around the rim of the concave recess for receiving a generally triangular lens having three similarly located tab means such that the lens snaps directly to the vehicle headliner.

In a preferred embodiment of the present invention also, the aperture means formed near the center of the concave recess formed in the panel includes a bridge extending thereacross for receiving a lamp socket holding clip. In a preferred embodiment also, the aperture means formed in the concave recess includes first and second apertures with a first aperture aligned with and positioned behind a lamp positioned in the lamp socket and a second aperture formed in the side of the concave recess for receiving electrical conductors coupled to the lamp socket.

With this construction, not only is the typical lamp housing eliminated, decorative trim bezel and fasteners such as screws or the like are eliminated from the structure which provides an inexpensive, attractive and modern appearing lamp assembly for use in a vehicle and one which can be integrated into a vehicle panel such as a headliner. These and other features, objects and advantages of the present invention will become apparent upon reading the following description thereof together with reference to the accompanying drawings in which:

BRIEF DESCRIPTION OF THE DRAWINGS

FIG. 3 is a underside view of the lamp assembly embodying the present invention taken in the direction indicated by Arrow III in FIG. 2, but from the opposite side of the panel;

FIG. 4 is an enlarged, fragmentary, perspective view of the structure shown in FIG. 3, taken in the direction indicated by Arrow IV in FIG. 3;

FIG. 5 is an enlarged, side elevational view of a portion of the structure shown in FIGS. 2-4; and FIG. 6. is a cross-sectional view taken along section line VI—VI of FIG. 2.

DETAILED DESCRIPTION OF THE PREFERRED EMBODIMENT

Figure 1:
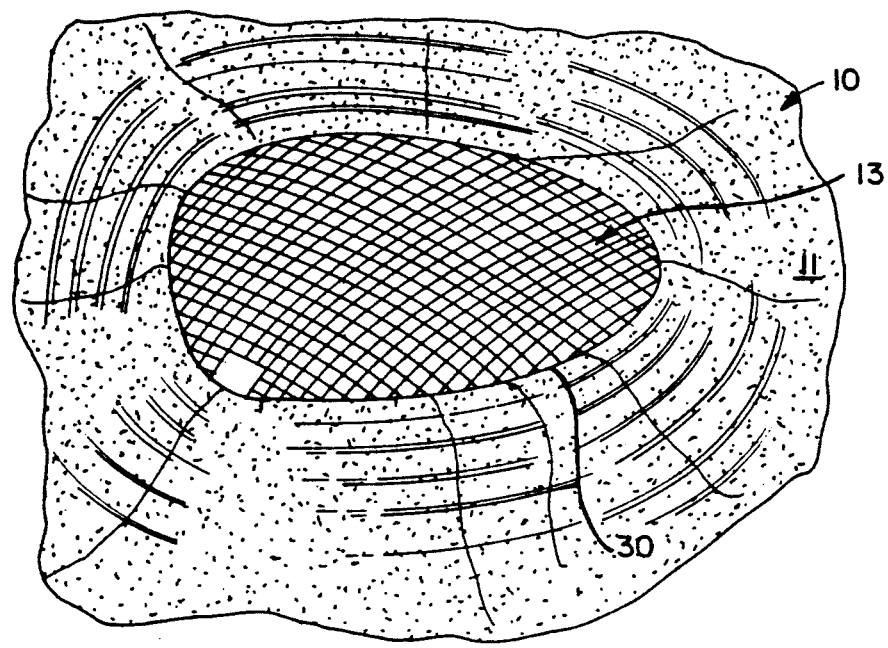
FIG. 1 is fragmentary, perspective view of a vehicle headliner including a lamp assembly embodying the present invention.
Figure 2:
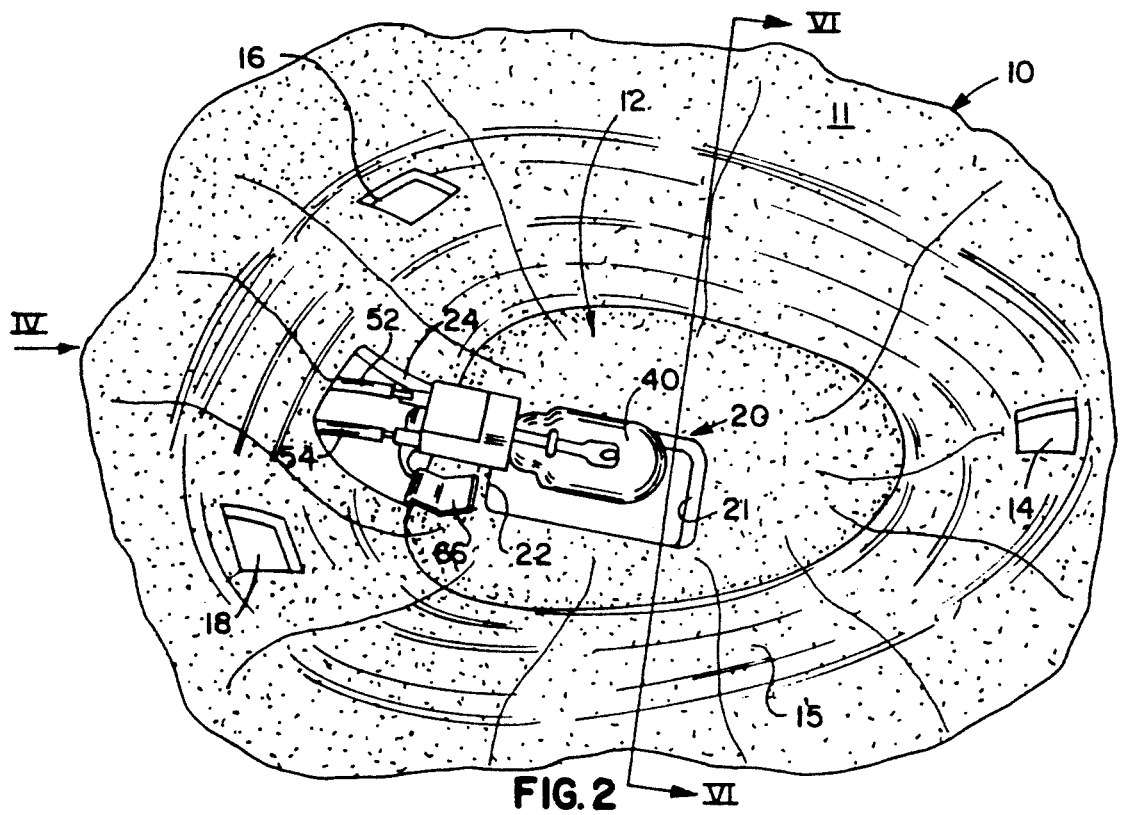
FIG. 2 is an enlarged view of the structure shown in FIG. 1 shown with the lens removed.

Referring initially to FIGS. 1 and 2, there is shown a headliner 10 for a vehicle such as an automobile or the like. The headliner 10 is a relatively thin, generally three-dimensional preformed panel shaped to fit within a particular vehicle body. Headliners are manufactured of a variety of composite materials frequently utilizing a molded resin impregnated fibrous bat material having an upholstered surface 11 facing the vehicle interior on one side. The opposite side 13 (FIGS. 3 and 4) is unfinished inasmuch as it is unexposed upon assembly. Any variety of commercially available methods, materials and systems are employed for molding headliner shapes in a variety of configurations with one such system disclosed in U.S. Pat. No. 4,828,910 issued May 9, 1989, and entitled SOUND ABSORBING LAMINATE, the disclosure of which is incorporated herein by reference. The panel 10, although a headliner in the preferred embodiment may also take the form of other vehicle panels such as a door panel which also can integrally include the present invention.

Referring now to FIGS. 2-4, the headliner 10 includes a concave depression or recess 12 formed therein which is from a side facing the upholstered side 11. Thus, in FIGS. 3 and 4, the concave recess 12 appears as a convex bulge. The recess 12 is integrally formed and molded with the headliner 10. Three generally equally spaced mounting slots 14, 16 and 18 are formed in the panel and located generally around the periphery of the concave recess 12 which is offset toward the interior of the vehicle in a preferred embodiment of the invention by a convex rim 15 (FIG. 6). Convex rim 15 surrounds the periphery of recess 12 and includes the mounting slots 14, 16, and 18. Recess 12 and surrounding rim 15 are generally rounded triangular in shape as best seen in FIGS. 2 and 3.

At the bottom of recess 12 there is formed aperture means 20 including a first generally rectangular aperture 21 aligned immediately behind a lamp 40 and a second generally rectangular aperture 24 formed in the curved side of recess 12 with a bridging member 22 extending between apertures 21 and 24 for receiving a bulb socket clip 60 as described below.

As seen in FIGS. 1 and 3, the lamp assembly includes a lens 30 which also has a generally rounded triangular shape with a light directing grid pattern formed on the interior surface thereof in a conventional manner for directing illumination from lamp 40 to the vehicle interior as desired. Lens 30 can be molded from a suitable material such as clear polycarbonate and includes three mounting tabs 44, 46 and 48 at the apecies of the generally triangular lens which snap-lock within apertures 14, 16 and 18 of the headliner 10 as best seen in FIGS. 3 and 4. For such purpose, each of the tabs include an arrowhead-shaped end 47 as best seen in FIG. 4 in connection with tab 48 which overlies the edge of the associated slot such as slot 18 shown in detail in this Figure.

In a preferred embodiment, the convex rim or peripheral rim 15 of the recess 12 is formed to extend downwardly somewhat from the plane of the headliner 10 as best seen in FIGS. 3 and 4 such that the lens 30 extends slightly below the adjacent surface of the headliner to provide additional clearance for the bulb 40. Bulb 40 is mounted in a conventional bulb socket 50 which is best seen in FIG. 5 and which includes a pair of conductors 52 and 54 extending therefrom for supplying electrical operating current to the bulb 40. For such purpose, conductors 52 and 54 are coupled to the vehicle's electrical system which may include conductors which are integrally mounted to the headliner assembly. A spring clip 60 attaches the socket 50 to the bridge 22 of the assembly as best seen in FIGS. 2-4.

Clip 60 includes a first leg 62 which is secured to socket 50 by means of a suitable fastener 64 such as a rivet or the like and an upwardly curved, generally C-shaped first pair of bifurcated lower arms 66 which extend on the upper surface 11 of the bridge member 22 formed at the bottom of recess 12 as best seen in FIG. 2. Spring clip 60 further integrally includes a pair of bifurcated upper arms 68 which, as best seen in FIGS. 3 and 4, compressibly grip the upper surface 13 of recess 12 and particularly the bridge section 22 thereof for holding the lamp socket 50 and bulb 40 therein in centered relationship to aperture 21 and spaced from the lowermost floor of recess 12 to provide clearance and heat dissipation for bulb 40. Bulb 40 may be a five candle power or other suitable sized bulb for use in vehicle interior lighting. Aperture 24 provides, as best seen in FIGS. 2-4, clearance for the assembly of clip 60 with legs 66 and 68 compressibly engaging bridge 22 and conductors 52 and 54 extending outwardly through the aperture formed in the sidewall of recess 12.

Installation of the lamp assembly to the headliner is easily accomplished by sliding clip 60 over bridge 22 and the subsequent snap-fitting of lens 30 into the mounting slot of the preformed headliner. Thus, the lamp assembly of the present invention provides an extremely modern, streamlined assembly as best seen in FIG. 1 and one which utilizes a minimum of parts and labor for its manufacture. The recess 12 can take on a variety of configurations including a round recess for receiving a round lens. These and various other modifications of the preferred embodiment of the invention will, however, fall within the spirit and scope of the invention as defined by the appended claims.

The embodiments of the invention in which an exclusive property or privilege is claimed are defined as follows:

1. A lamp assembly for a vehicle comprising:
    a vehicle panel for mounting to a vehicle, said panel having a surface facing the interior of the vehicle, said panel formed to integrally include a depression formed in said surface, said depression having a floor and curved sidewalls, a plurality of spaced lens receiving mounting slots formed in said panel at the periphery of said depression, said depression including a pair of spaced apertures, with one of said apertures formed in the floor thereof and the other of said apertures formed in said sidewall, said panel further including a bridge extending between said apertures;
    a lamp socket including clip means for attaching said socket to said bridge for positioning a lamp fitted in said socket with said depression of said panel; and
    lens means including tab means extending into said mounting slots for snap mounting said lens means to said vehicle panel.

2. The lamp assembly as defined in claim 1 wherein said vehicle panel comprises a headliner.

3. The lamp assembly as defined in claim 1 wherein said depression is generally triangular.

4. The lamp assembly as defined in claim 3 wherein said panel includes a mounting slot at each apex of said generally triangular depression.

5. The lamp assembly as defined in claim 4 wherein said slip comprises a spring-steel clip having spaced arms which compressible engage opposite sides of said bridge.

6. The lamp assembly as defined in claim 5 wherein a first of said pair of apertures is aligned with said lamp and a second of said pair of apertures receives conductors associated with said socket.

7. The lamp assembly as defined in claim 1 wherein said panel further includes an outwardly projecting rim extending around the periphery of said depression and said slot means are formed in said rim such that said lens is offset with respect to said vehicle panel.

8. The lamp assembly as defined in claim 7 wherein said panel is a vehicle headliner.

9. The lamp assembly as defined in claim 8 wherein said depression and said rim are generally triangular.

10. The lamp assembly as defined in claim 9 wherein said headliner panel includes a mounting slot at each apex of said generally triangular depression.

11. The lamp assembly as defined in claim 10 wherein said clip comprises a spring-steel clip having spaced arms which compressible engage opposite sides of said bridge.

12. The lamp assembly as defined in claim 11 wherein a first of said pair of apertures is aligned with said lamp and a second of said pair of apertures receives conductors associated with said socket.

* * * * *

UNITED STATES PATENT AND TRADEMARK OFFICE
CERTIFICATE OF CORRECTION

PATENT NO. : 5,329,429
DATED : July 12, 1994
INVENTOR(S) : Larry E. Mathias et al.

It is certified that error appears in the above-indentified patent and that said Letters Patent is hereby corrected as shown below:

Column 4, line 40
"slip" should be --clip--;

Column 4, line 41
"compressible" should be --compressibly--;

Column 4, line 61, claim 11
"compressible" should be  --compressibly--.

Signed and Sealed this

Fourth Day of April, 1995

Attest:

BRUCE LEHMAN

Attesting Officer        Commissioner of Patents and Trademarks